United States Patent
Lekven et al.

(10) Patent No.: US 6,289,226 B1
(45) Date of Patent: Sep. 11, 2001

(54) SYSTEM AND METHOD FOR DISPLAY PARSING IN A WIRELESS COMMUNICATION DEVICE

(75) Inventors: Eric J. Lekven, Carlsbad; Diego Kaplan, San Diego, both of CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 09/133,034

(22) Filed: Aug. 17, 1998

(51) Int. Cl.[7] .................................................. H02Q 7/32
(52) U.S. Cl. ........................ 455/566; 455/414; 455/564
(58) Field of Search ................................ 455/412, 414, 455/415, 407, 406, 456, 564, 565, 566, 550, 38.4, 461, 466; 379/142, 201, 354, 406

(56) References Cited

U.S. PATENT DOCUMENTS

| | | | |
|---|---|---|---|
| 5,299,261 | * | 3/1994 | Bogart et al. ........................ 379/354 |
| 5,535,260 | * | 7/1996 | Zicker et al. ........................ 455/564 |
| 5,966,652 | * | 10/1999 | Coad et al. ........................ 455/566 |
| 5,991,383 | * | 11/1999 | Kucmerowski et al. ............ 379/142 |

* cited by examiner

*Primary Examiner*—Lester G. Kincaid
(74) *Attorney, Agent, or Firm*—Philip R. Wadsworth; Charles D. Brown; Christopher O. Edwards

(57) ABSTRACT

A technique for parsing numbers on a display in a wireless communication device utilizes a data storage area containing data related to the dialing plan for the particular location of the user, such as a country. A parser receives the number and applies the number digit by digit to the data in the dialing plan storage area to determine whether the number corresponds to a known telephone number format for the particular country. If the number corresponds to a known format, one of a predetermined number of parsing formatting characters are applied to the number and the number with formatting characters is shown on a display. The user may edit the formatting characters to customize the format for personal preferences. The number may be provided to the parser by manual entry of digits by the user via a keypad, or may be automatically provided to the parser by user selection of a number in a telephone book storage area, a call history storage area, or the like. The number may also be provided to the wireless communication device from a remote location. Numbers, such as caller ID, callback numbers, and the like may be automatically provided to the parser.

18 Claims, 6 Drawing Sheets

DATA ENTRIES

| STATE | 0 | 1 | 2 | 3 | 4 | 5 | 6 | 7 | 8 | 9 | * | # | FORMAT |
|---|---|---|---|---|---|---|---|---|---|---|---|---|---|
| 1 | 2 | 12 | 26 | 26 | 26 | 26 | 26 | 26 | 26 | 26 | 32 | | |
| 2 | | 3 | | | | | | | | | | | |
| 3 | | 4 | 4 | 4 | 4 | 4 | 4 | 4 | 4 | 4 | | | |
| 4 | 5 | 5 | 5 | 5 | 5 | 5 | 5 | 5 | 5 | 5 | | | |
| 5 | 6 | 6 | 6 | 6 | 6 | 6 | 6 | 6 | 6 | 6 | | | |
| 6 | 7 | 7 | 7 | 7 | 7 | 7 | 7 | 7 | 7 | 7 | | | |
| 7 | 8 | 8 | 8 | 8 | 8 | 8 | 8 | 8 | 8 | 8 | | | |
| 8 | 9 | 9 | 9 | 9 | 9 | 9 | 9 | 9 | 9 | 9 | | | |
| 9 | 10 | 10 | 10 | 10 | 10 | 11 | 11 | 11 | 11 | 11 | | | |
| 10 | 11 | 11 | 11 | 11 | 11 | 11 | 11 | 11 | 11 | 11 | | | |
| 11 | | | | | | | | | | | | | |
| 12 | 23 | 13 | 13 | 13 | 24 | 13 | 13 | 13 | 13 | 13 | | | |
| 13 | 14 | 14 | 14 | 14 | 14 | 14 | 14 | 14 | 14 | 14 | | | |
| 14 | 15 | 15 | 15 | 15 | 15 | 15 | 15 | 15 | 15 | 15 | | | 1 |
| 15 | 16 | 16 | 16 | 16 | 16 | 16 | 16 | 16 | 16 | 16 | | | 1 |
| 16 | 17 | 17 | 17 | 17 | 17 | 17 | 17 | 17 | 17 | 17 | | | 1 |
| 17 | 18 | 18 | 18 | 18 | 18 | 18 | 18 | 18 | 18 | 18 | | | 1 |
| 18 | 19 | 19 | 19 | 19 | 19 | 19 | 19 | 19 | 19 | 19 | | | 1 |
| ⋮ | | | | | | | | | | | | | |
| ⋮ | | | | | | | | | | | | | |
| 26 | 27 | 27 | 27 | 27 | 27 | 27 | 27 | 27 | 27 | 27 | | | 2 |
| 27 | 28 | 28 | 28 | 28 | 28 | 28 | 28 | 28 | 28 | 28 | | | 2 |
| 28 | 29 | 29 | 29 | 29 | 29 | 29 | 29 | 29 | 29 | 29 | | | 2 |

162

SYSTEM AND METHOD FOR DISPLAY PARSING IN A WIRELESS COMMUNICATION DEVICE

FIELD OF THE INVENTION

The present invention is related generally to a wireless communication device and, more particularly, to a system and method for parsing numbers displayed on a display to assist in operating a wireless communication device.

DESCRIPTION OF THE RELATED ART

Wireless communication devices, such as cellular telephones, are widely used as a replacement for conventional telephone systems. In addition to functioning as a replacement for a conventional telephone, wireless communication devices offer the advantage of portability, thus enabling the user to establish a wireless communication link between virtually any two locations on Earth.

The wireless communication device typically includes some form of display that provides the user with information, such as the destination telephone number for outgoing calls and caller ID for incoming calls. The destination telephone number may be entered manually by the user by activating a keypad on the wireless communication device. Alternatively, the user may select a prestored destination telephone number from a phone book storage area.

In a conventional display, the telephone numbers are shown on the display as a continuous string of digits with no separations for elements such as area codes, telephone exchanges, and the like. This results in difficulty in interpreting the data shown on the display. Therefore, it can be appreciated that there is a significant need for a system and method that will readily allow the user to interpret the data on a wireless communication device display. The present invention provides this and other advantages as will be apparent from the following figures and accompanying description.

SUMMARY OF THE INVENTION

The present invention is embodied in a system and method for providing visual user feedback in a wireless communication device. In one exemplary embodiment, the system includes a dialing plan storage area that contains data related to the dialing plan for the specific location (e.g., a country) of the user. A parser receives a number and applies the number digit by digit to the data contained within the dialing plan storage area. Based on the sequence of digits provided to the parser, a system can determine whether the number corresponds to a valid telephone number for the specified dialing plan. If the number does correspond to a valid telephone number, the parser applies a predetermined format for that telephone number and displays the number on a display with the appropriate formatting characters inserted between the digits. Typical formatting characters include: hyphen, parentheses, space, period and/or slash. If the number does not correspond to a valid telephone number, the system will not apply formatting characters to the number.

In an exemplary embodiment, the user manually enters the number via a keypad. Alternatively, the user may select a number from a phone book storage area or a call history storage area. The number may also be provided to the wireless communication device from a remote location. Numbers, such as caller ID, may be automatically provided to the parser. Similarly, numbers from remote locations may be included in a predetermined portion of a standardized message format. For example, a short messaging services (SMS) standard has a data portion preserved for a callback number. The system can automatically extract the callback number and provide it to the parser. In addition, a callback, or other telephone number may be provided within the SMS message. Again, the system can automatically extract the embedded number and provide it to the parser.

The data in the dialing plan storage area may be stored in the form of a data table. A portion of the data table is used as an index to a location within a parsing format storage area. The parsing format storage area may store parsing formats for a variety of different numbers, such as a local telephone number format, domestic long-distance telephone number format, international long-distance telephone number format, and the like. The formats in a parsing format storage area can correspond to conventional formatting characters used in the user's location. Alternatively, the user may edit the data in the parsing format storage area to personalize formatting character selection.

DETAILED DESCRIPTION OF THE PREFERRED EMBODIMENTS

The present invention is directed to a technique for separating or parsing digits on a wireless communication device in accordance with customary dialing plan rules for the particular geographic area in which the phone is used. For example, the United States is divided into geographic areas that each have a designated three digit area code. In addition, each telephone number in the United States comprises a three digit telephone exchange and a four digit subscriber number. Therefore, the entire phone number for the U.S. is a ten digit number representing the area code, telephone exchange, and subscriber number. In the United States, people typically parse the ten digit telephone number by putting parenthesis around the area code and a hyphen between the telephone exchange and the subscriber number, such that the ten digit telephone number has the following appearance: (NXX) NXX-XXXX, where N is any numeric digit between 2 and 9 and X is any numeric digit between 0 and 9.

Unfortunately, the conventional wireless communication device simply displays a ten digit string which is difficult for the user to interpret. The present invention utilizes data derived from a dialing plan for the specific geographic location of the user and applies the dialing plan rules to digits for display to the user. As will be discussed in detail below, each country has a different dialing plan. Therefore, no universal rules can be applied to properly parse digits for a display. However, the present invention utilizes a state diagram to indicate the present logic state of the wireless communication device where the state diagram is based on the dialing plan for the particular geographic region (e.g., the United States) in which the wireless communication device is used. In this manner, the wireless communication device can properly parse digits in a meaningful manner.

Figure 1:
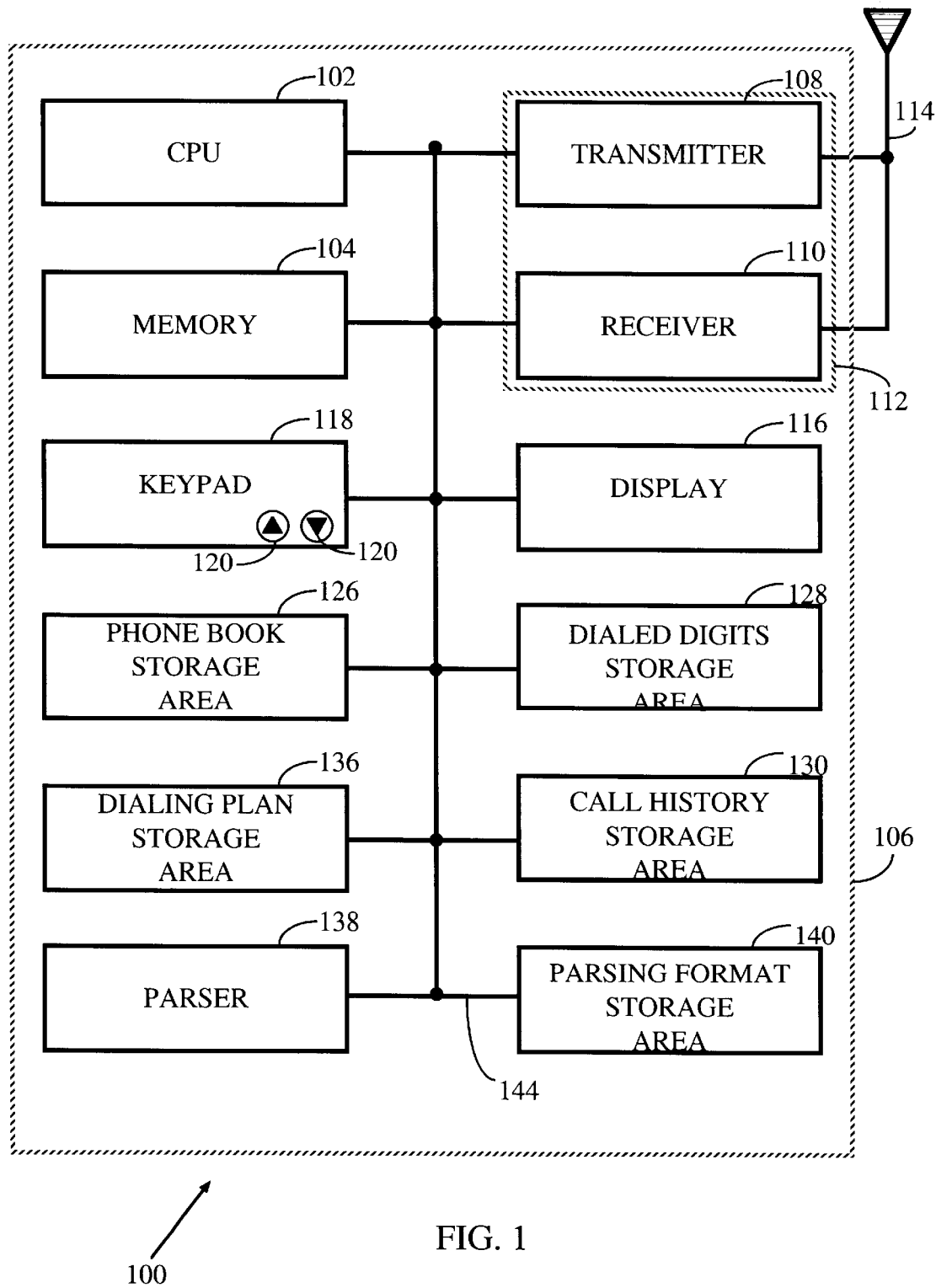
FIG. 1 is a functional block diagram of an exemplary embodiment of the wireless communication device of the present invention.

The present invention is embodied in a system 100 illustrated in the functional block diagram of FIG. 1. The system 100 includes a central processing unit (CPU) 102, which controls operation of the system. A memory 104, which may include both read-only memory (ROM) and random access memory (RAM), provides instructions and data to the CPU 102. A portion of the memory 104 may also include non-volatile random access memory (NVRAM).

The system 100, which is typically embodied in a wireless communication device such as a cellular telephone, also includes a housing 106 that contains a transmitter 108 and a receiver 110 to allow transmission and reception of data, such as audio communications, between the system 100 and a remote location, such as a cell site controller (not shown). The transmitter 108 and receiver 110 may be combined into a transceiver 112. An antenna 114 is attached to the housing 106 and electrically coupled to the transceiver 112. The operation of the transmitter 108, receiver 110, and antenna 114 is well known in the art and need not be described herein.

The system 100 also includes a display 116 to conveniently display instructions to the user as well as user-entered data, such as destination telephone numbers and alphanumeric text. In an exemplary embodiment, the display 116 is sized to display four lines of alphanumeric text with each line capable of displaying up to fourteen alphanumeric characters.

A keypad 118 is attached to the housing 106 for operation by the user in a conventional manner. As will be described below, the keypad 118 provides a convenient input device by which destination telephone numbers and alphanumeric text may be entered by the user. The keypad 118 also includes one or more scroll buttons 120 to assist the user in the operation of the system 100.

The system 100 also includes a phone book storage area 126 to store a plurality of destination telephone numbers and associated names. In an exemplary embodiment the phone book storage area 126 is capable of storing up to 99 telephone numbers. Each entry in the phone book storage area 126 is manually programmed by the user via the keypad 118. The phone book storage area 126 may be included in the NVRAM portion of the memory 104 or may be a separate storage area. The user can select one of the destination telephone numbers from the phone book storage area 126 in a conventional manner using the scroll buttons 120 to scroll through the contents of the phone book storage area. Alternatively, the user may perform a text search using the keypad 118 to enter the desired text for the search.

In addition, the wireless communication device typically includes a dialed digit storage area 128. The user may manually enter a destination telephone number using the keypad 118. Alternatively, the user may select the desired destination telephone number from the phone book storage area 126. The destination telephone number selected from the phone book storage area 126 is automatically entered into the dialed digits storage area 128. In operation, the transmitter 108 of the wireless communication device transmits the data in the dialed digits storage area 128 to a remote location, such as a cell site controller, to establish a communication link between the wireless communication device and the communication device associated with the destination telephone number.

In an exemplary embodiment, the system 100 also includes a call history storage area 130 to store recently dialed telephone numbers. For example, the call history storage area 130 may contain the last 10 outgoing calls from the wireless communication device. In a typical embodiment, the call history storage area may include calling data for incoming calls as well as outgoing calls. The call history storage area 130 may be part of the memory 104 or a separate storage area. The use of the call history storage area 130 is well known in the art and need not be described in detail herein. In an exemplary embodiment, the call history storage are 130 contains call history data for both incoming and outgoing calls from the wireless communication device. However, the call history storage area 130 may be used for outgoing calls only.

As discussed above, the system 100 relies on dialing plan data for the specific geographic location of the user. The description provided below relates to the dialing plan used in the United States. However, the principles in the present invention may readily be extended to other countries. A dialing plan storage area 136 provides data to the system 100 regarding the present logic state of the wireless communication device. As will be discussed in detail below, the data and dialing plan storage area 136 allows the system 100 to determine the type of telephone number to be processed for display. That is, the dialing plan storage area 136 contains data that allows the system 100 to differentiate between international long-distance calls, domestic long-distance calls, local calls, and the entry of other numbers, such as long-distance access codes "911," directory assistance, or credit card numbers that do not correspond to a legitimate destination telephone number. The structure and operation of the dialing plan storage area 136 will be discussed in greater detail below.

The system 100 includes a parser 138 to parse the digits shown on the display 116 in a meaningful format. The parser 138 utilizes data from the dialing plan storage area 136 to determine how the displayed digits should be parsed. The system 100 also includes a parsing format storage area 140 that contains formatting data for the parsing. The parsing format storage area 140 may include predetermined conventional formatting characters, such as parenthesis and hyphens that are commonly used in the United States, or may include formatting characters commonly used in other countries. In addition, the system 100 provides the capability of user selected formatting characters that may be stored in the parsing format storage area 140. The parsing format storage area 140 may be part of the memory 104, or a separate storage area.

The various components of the system 100 are coupled together by a bus system 144 which may include a power bus, control signal bus, and status signal bus in addition to a data bus. However, for the sake of clarity, the various buses are illustrated in FIG. 1 as the bus system 144.

Figure 2:
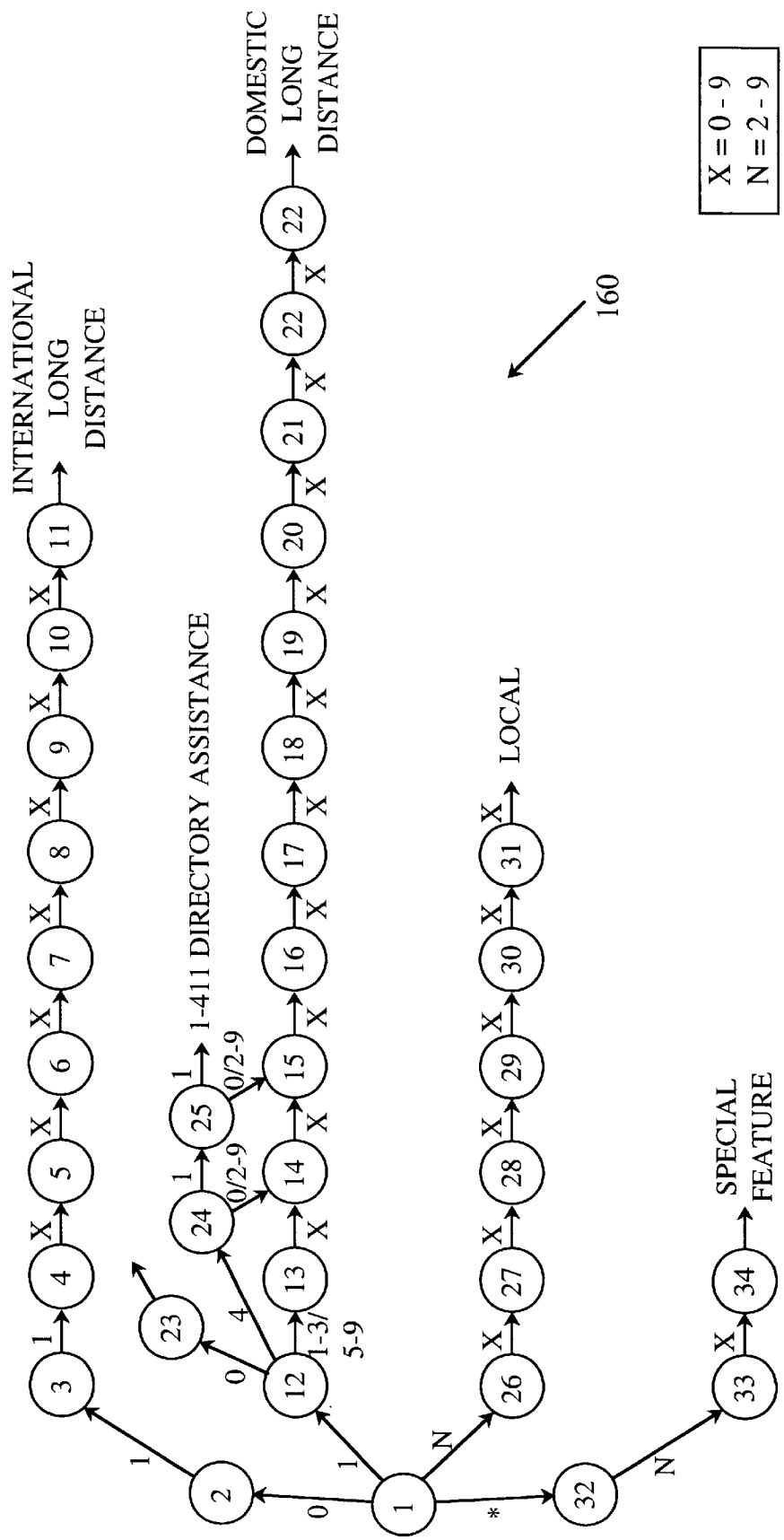
FIG. 2 illustrates a state diagram used by the wireless communication device of FIG. 1.

To aid in understanding the operation of the parser 138, a brief discussion of the operation of the dialing plan storage area 136 is presented. As discussed below, the dialing plan storage area 136 is used to identify the type of number provided to it. The data provided to the dialing plan storage area 136 may be in the form of dialed digits entered by the user via the keypad 118, or digits selected from the phone book storage area 126, the call history storage area 130 or extracted from a message received by the wireless communication device. A partial calling plan for the United States is illustrated in the form of a state diagram, shown in FIG. 2. The system 100 begins at an initial state, State 1, indicated by a circle with the reference numeral 1 in FIG. 2. As digits are supplied to the system 100, the system changes states. The first digit entered by the user causes the system 100 to change from State 1 to a different state depending on the value of the digit. If the user enters the numeric digit 0, the system 100 changes to a state, State 2. From State 2, the user enters additional digits that cause the system 100 to change states as each digit is entered. As illustrated in FIG. 2, if the user enters the numeric digit 1, the system 100 changes from the State 2 to a state, State 3. If the user enters an additional numeric digit 1 while in the State 3, the system 100 changes to a state, State 4 that indicates the entered digits correspond to an international long-distance call. As can be appreciated by those of ordinary skill in the art, additional digits indicative of a country code, city code, telephone number, and the like are also entered into the system 100. The specific sequence of digits entered by the user depend on the destination telephone number. Details of this sequence need not be described herein. Once the system 100 has determined the type of number being entered (e.g., an international long-distance telephone call), the parser 138 (see FIG. 1) will parse the telephone number using the data in the parsing format storage area 140 so that the display 116 will display the telephone number in a format familiar to the user.

Similarly, from the State 1, the user can enter the numeric digit 1 causing the system 100 to change to a state, State 12. The entry of any numeric digit 1–3 or 5–9 causes the system 100 to change from the State 12 to a state, State 13. The entry of any subsequent numeric digit X, where X is any numeric digit from 0–9, causes the system 100 to change from the State 13 to a state, State 14. The entry of additional numeric digits from the State 14 would be indicative of a U.S. long-distance call. As those of ordinary skill in the art can appreciate, the entry of 8 additional digits is required to complete a U.S. long-distance call if the system is at the State 14 with the system ending in a state, State 22, if the user entered valid numeric digits, as opposed to, for example, an asterisk. Each time the user enters an additional numeric digit X, the system 100 changes states. Based on the dialing plan for the particular location (e.g., the United States), the system 100 identifies the digits as corresponding to a complete U.S. long-distance destination telephone number.

Figure 3A:
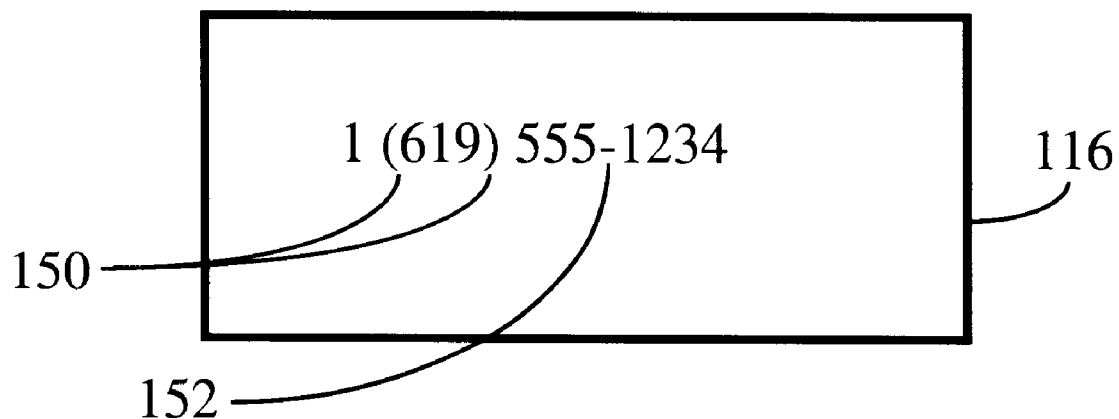
FIGS. 3A and 3B illustrate examples of the display of the wireless communication device of FIG. 1 showing the inclusion of formatting characters in the display.

FIG. 3A illustrates a sample of the display 116 using formatting characters in accordance with the principles of the present invention. In FIG. 3A, parenthesis 150 are used as a formatting character around the area code, while a hyphen 152 is used as a formatting character between the telephone exchange and the subscriber number. As will be discussed below, the parsing format storage area 140 (see FIG. 1) contains alternative formatting characters that can be selected by the user.

Returning to the state diagram of FIG. 2, from the State 1, the entry of any numeric digit N (i.e., 2–9) causes the system to change to a state, State 26. The subsequent entry of any numeric digit X (i.e., 0–9) causes the system 100 to change from the State 26 to a state, State 27. As illustrated in FIG. 2, the entry of additional digits while the system 100 is in the State 27 is indicative of a local call. As can be appreciated by those of ordinary skill in the art, a total of seven digits, beginning with the digit N, is indicative of a local call with the system 100 ending in a state, State 31, if the user entered valid numeric digits. Once a telephone number has been identified as a local call, the parser 138 (see FIG. 1) applies the appropriate format from the parsing format storage area 140.

Figure 3B:
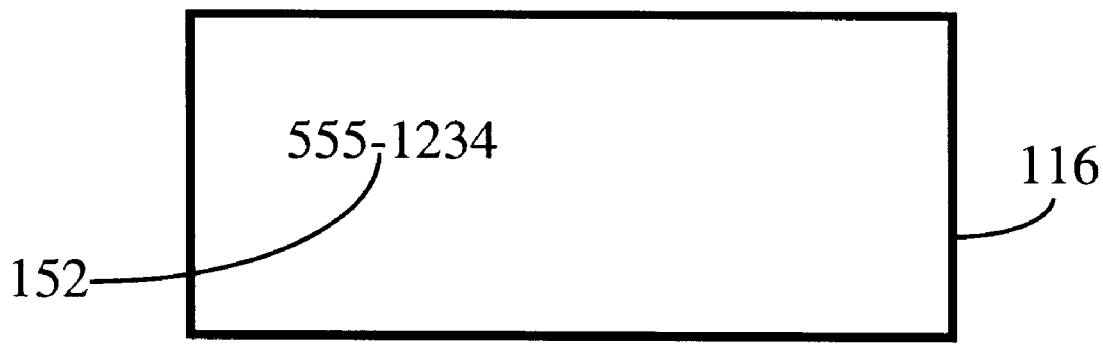

FIG. 3B illustrates an example display of a local telephone number where the hyphen 152 serves as the formatting character between the telephone exchange and the subscriber number. Thus, the system 100 changes states as each additional digit is received.

Using the data in the dialing plan storage area 136 (see FIG. 1), the system 100 can determine whether the user has entered a local telephone number, a long-distance telephone number, or an international long-distance telephone number. As will be discussed in detail below, numbers such as long-distance access numbers, credit card numbers and the like, do not generally correspond to a valid destination telephone number using the data in the dialing plan storage are 136. Accordingly, the parser 138 will not apply formatting characters to numbers that do not correspond to a known valid telephone number. This advantageously avoids confusion to the user that may result from simply applying formatting characters without regard to whether the number is a valid telephone number. For example, a system could blindly insert a hyphen between the third and fourth digits of any seven-digit number. Although this would provide correct parsing if the number is an actual local telephone number, the parsing is incorrect if the seven-digit number is, by way of example, a long-distance access code. Similarly, a system could automatically insert parentheses around the second to fourth numbers in an 11digit number. Although this would be appropriate parsing if the 11-digit number is a long-distance telephone number, it is incorrect for any other application. Accordingly, the automatic insertion of formatting characters without regard for validity of the number as a telephone number, frequently results in inappropriate parsing and leads to user confusion when viewing the displayed data. The system 100 avoids such confusion by applying formatting characters only when the string of digits is applied to the calling plan storage area 136 and results in a valid telephone number. Each activation of the numeric keys on the keypad 118 causes the system 100 to change states. The system 100 can determine when the user has entered the appropriate number of digits to complete a local or long-distance call based on the particular state of the wireless communication device.

The state diagram 160 advantageously permits the parser 138 (see FIG. 1) to insert formatting characters at the appropriate point in the destination telephone number. In addition to formatting characters, such as hyphens and parenthesis, the system 100 may insert spaces at appropriate points to provide greater readability of numbers shown on the display 116. In the example above where the destination telephone number is 1 (619) 555-1234, the parser 138 can insert a space following the digit 1 when the system 100 enters the State 13 and place a parenthesis around the area code as the user enters the digits corresponding to States 13–15, respectively. In addition, the parser 138 will insert a hyphen when the user has completed the entry of the telephone exchange number at State 18. Similarly, the state diagram 160 may be used for other numbers, such as a seven-digit local telephone number. In this example, the parser 138 will insert a hyphen between the third and fourth digits entered by the user.

It should be noted that the system 100 will not transmit formatting characters, which are meaningless to most communication systems. Instead, the formatting characters are added only for data shown on the display 116 to provide the user with increased readability of displayed telephone numbers.

The previous description has been directed primarily to destination telephone numbers that had been manually entered by the user via the keypad 118. However, the system 100 is equally applicable to destination telephone numbers stored in the phone book storage area 126 as well as telephone numbers stored in the call history storage area 130. In both cases, the parser 138 uses the state diagram 160 stored in the dialing plan storage area 136 to determine the type of call and thus the appropriate formatting for the digits. For example, a telephone number from the phone book storage area may be a seven-digit local telephone number. By applying the state diagram 160 to a seven-digit number, the system may readily determine whether it is a valid local telephone number. If the stored number corresponds to a valid local telephone number, the parser 138 will apply the appropriate formatting. If the stored telephone number does not correspond to a valid local telephone number, the system 100 will not apply parsing formatting to the data. For example, the user may store an access code for remote access of voice mail. If the remote access number does not correspond to any valid telephone number according to the state diagram 160, the parser 138 will not apply any parsing formatting to the stored number. Similarly, the user may store a long-distance access code in the phone book storage area 120. The parser 138 will not apply for parsing formatting to any stored number that does not conform to one of the destination telephone number formats established by the state diagram 160.

Telephone numbers stored in the call history storage area 130 can also be processed by the parser 138 using the state diagram 160 in the manner described above to determine the proper parsing formatting. Thus, telephone numbers from the call history storage area 130 will be shown on the display 116 with the proper formatting for the U.S. dialing plan.

In addition, the system 100 may process incoming calls using the state diagram 160 and apply the proper parsing format. For example, the system 100 is applicable to callback telephone numbers contained within a message, such as a short messaging service (SMS) data message, or contained within a predetermined callback telephone number portion of the SMS message. The system 100 operates in the manner described above and uses the state diagram 160 to sequentially process the digits from the incoming call (e.g., the callback telephone number) and will apply the proper formatting characters if the number corresponds to a valid telephone number. Similarly, the system 100 may use the state diagram 160 to process caller ID data transmitted to the wireless communication device. The parser 138 operates in the manner described above, to sequentially process the numeric digits of the caller ID data. The parser 138 will apply the appropriate formatting characters to the caller ID number if the caller ID number corresponds to a valid telephone number. In each of these situations, the received telephone number is sequentially processed digit by digit using the state diagram 160 to determine the proper formatting. Thus, the data shown on the display 116 will have a format readily recognizable to the user.

Figure 4:
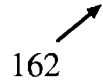
FIG. 4 illustrates a data table implementation of the state diagram of FIG. 2.

The state diagram 160 is readily stored in the dialing plan storage area 136 in the form of a data table 162, such as illustrated in FIG. 4. While shown in FIG. 4 as a data table, those of ordinary skill in the art will recognize that any suitable data structure may be used to store the data corresponding to the state diagram 160. The term "table" is intended to encompass any convenient form of data storage. The present invention is not limited by the specific form of data structure used to store data corresponding to the state diagram 160.

Each state of the state diagram 160 is used as an index to the data table 162. At each state, the user may enter a numeric digit X (i.e., 0–9) or a control digit, such as the "*" key or the "#" key. The entry of an additional digit points to a specific location in the data table 162 that indicates the next state of the system 100 based on the current state and the additional digit. It should be noted that the data table 162 in FIG. 4 does not illustrate each possible state of the system 100. The number of possible machine states is dependent on the specific dialing plan implemented in the country in which the system 100 is operated. For the sake of brevity, only a limited number of machine states are illustrated in the data table 162 shown in FIG. 4. However, based on the above description, it can be readily seen that the data table 162 contains one or more data locations for each logic state and a pointer to the next logic state for each of the possible data entries. For example, the data table 162 has a data entry for the logic state, State 1, and it has a pointer to the state, State 2, that corresponds to the numeric digit 0, a pointer to the state, State 12, that corresponds to the numeric digit 1, and pointers to the state, State 26, corresponding to the numeric digits 2–9. Similarly, the state, StateÉ1, also includes a pointer to the state, State 32, that corresponds to the control digit "*." In the United States, the control digit "*" is often used in conjunction with additional numeric keys to enable or disable special features, such as transmit or block caller ID, cancel call forwarding, and the like. The system 100 can insert a space as a formatting character following the entry of a special feature code.

In addition, it is possible to enter data on the keypad 118 (see FIG. 1) that result in an inoperable or illegal machine state. For example, if the system 100 is in State 1, the entry of multiple 0's on the keypad 118 results in an illegal machine state. Therefore, the data entries illustrated in the data table 162 can indicate that the system 100 is in an illegal state and the present call can be terminated based on the present state of the system. For example, if the system 100 has not yet transmitted digits in the dialed digits storage area 128 (see FIG. 1) and receives digits that place the system in an illegal state, the call is terminated. However, if a call is already in progress and the system receives a series of digits that do not correspond to a valid telephone number, the ongoing call is not terminated. The series of digits may correspond, by way of example, to a calling card number. Thus, the parser 138 will not apply any parsing format to the series of digits and the ongoing call progresses normally.

In an alternative embodiment, the parser 138 (see FIG. 1) will only apply parsing formatting when the system 100 is in certain logic states, such as initiating a call to a remote communication device (i.e., placing an outgoing call) or when receiving numbers such as caller ID or callback telephone numbers from an incoming call. In this embodiment, the system 100 avoids applying parsing formatting to numbers, such as credit card numbers or access codes, even if the number happens to correspond to a valid telephone number. For example, the parser 138 will apply parsing formatting to a seven-digit number (i.e., a local call) when the wireless communication device is initially placing a call, but will not apply parsing formatting to a seven-digit number (e.g., an access code) that is entered during the course of the ongoing call. However, if the user enters commands to initiate a three-way call, the parser 138 can apply parsing formatting to the telephone number of the third party. In addition, the system 100 can generate an error message to be shown on the display 116.

In addition to storing data pointers to the next logic state, the data table 162 contains data indicative of any formatting characters that should be applied to the displayed digits based on the sequence of digits processed by the parser 138 (see FIG. 1). The dialing plan storage area 136 includes a data portion to indicate the format type that will be applied to data shown on the display 116. The format type data portion in the dialing plan storage area 136 indicates one of a plurality of data formats that may be stored in the parsing format storage area 140. The parser 138 accesses the parsing format storage area 140 to extract the appropriate formatting data and applies the formatting data to the telephone number to be shown on the display 116. For example, in State 22, which corresponds to a domestic long-distance call, the format type data portion indicates data format 1. The format type data portion of the dialing plan data table 162 indicates a location in the parsing format storage area 140 where the specified formatting characters may be found. The parser 138 utilizes the specified formatting characters from the parsing format storage area 140 and adds the selected formatting characters to the number shown on the display 116.

Figure 5A:
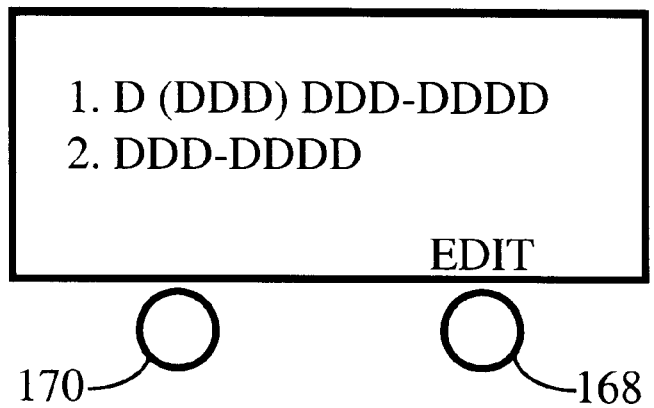
FIG. 5A illustrates the selection of parsing formats used by the wireless communication device of FIG. 1.

FIG. 5A provides an example of the parsing format storage area 140. As illustrated in FIG. 5A, the parsing format storage area 140 may contain default formatting characters that will be inserted between the digits D of the number shown on the display 116. For example, data format 1 is for a domestic long-distance call and uses spaces, parenthesis, and hyphens as formatting characters. Similarly, data format 2, which corresponds to a local call, includes only a hyphen formatting character between the telephone exchange and subscriber number. In an exemplary embodiment, the user may edit the parsing format storage area 140 to provide customized formatting characters. In this embodiment, the user enters an edit mode, such as illustrated by an "Edit" option in FIG. 5A, in which at least a portion of the data from the parsing format storage area 140 shown on the display 116. The user activates the scroll keys 120 to select one of the parsing formats shown on the display 116. The selected parsing format may be shown, by way of example, in reverse video to indicate which parsing format has been selected.

Figure 5B:
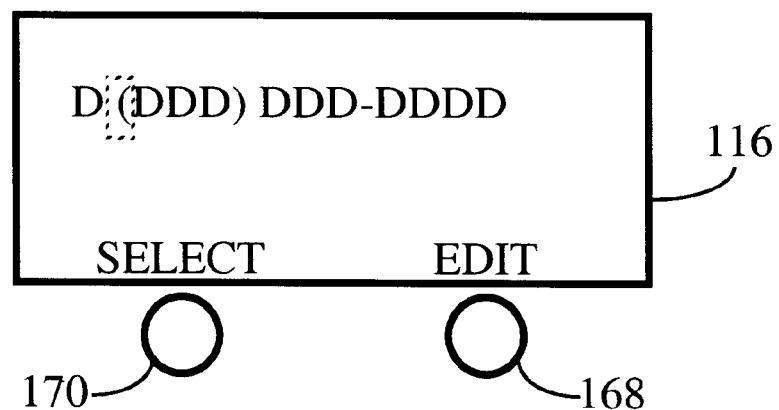
FIG. 5B illustrates an editing operation for a selected one of the parsing formats of FIG. 5A.

The user may edit the selected parsing format by activating, by way of example, a control key 168. In response to the activation of a parsing format edit mode, the system 100 shows the selected parsing format on the display 116, as shown in FIG. 5B. In the example of FIG. 5B, the user has elected to edit the parsing format for a domestic long-distance call. The user may edit the formatting characters using conventional text editing techniques. For example, the system 100 may display the parsing format with the first formatting character highlighted using, by way of example, reverse video display. The user can edit the highlighted formatting character by activating the control key 168 or move to a different formatting character by activating an additional control key 170. If the user elects to edit the formatting character, the user can alter the contents of the display 116 by activating the scroll keys 120 to select a different formatting character from a predetermined list. For example, the predetermined list (not shown) may include open and closed parenthesis, hyphens, periods, slashes, spaces, and the like. The user selects the desired formatting character for the highlighted location by using the control key 170. Upon activation of the control key 170, the display 116 highlights the next formatting character in the selected parsing format and allows the user to custom select each formatting character for a particular format. When the editing process is complete, the user may activate the control button 170 to store the custom designed parsing format in the format storage area 140. It should be understood that the formatting characters described above are conventionally used in the United States, however, other countries may use different formatting characters. Accordingly, the present invention is not limited by the specific form of the formatting characters.

The system 100 may be advantageously programmed with the data table 162 (see FIG. 4) for operation in different countries. For example, the data table 162, illustrated in FIG. 4, corresponds to the calling plan used in the United States. However, an alternate or additional data table (not shown) may contain data related to the calling plan for a different country, such as Germany. Multiple data tables 230 within the dialing plan storage area 136 are useful in areas where the user travels between countries with different dialing plans. For example, the user may be in Europe and can conveniently switch between the dialing plans of different countries, such as Germany, France, and Italy. The current location of the user (i.e., the current country) may be selected using conventional editing techniques. For the sake of brevity, the state diagram 160 and data table 162 are described only briefly. However, those of ordinary skill in the art will recognize that the entry of additional digits will cause the system 100 to change machine states in accordance with the specific calling plan of the country. Details on the use of data tables to store calling plans are provided in U.S. patent application Ser. No. 08/1608,924, filed on Feb. 29, 1996 and entitled "TELEPHONE NUMBER PARSER FOR WIRELESS LOCAL LOOP TELEPHONES" which is incorporated herein by reference in its entirety.

Figure 6:
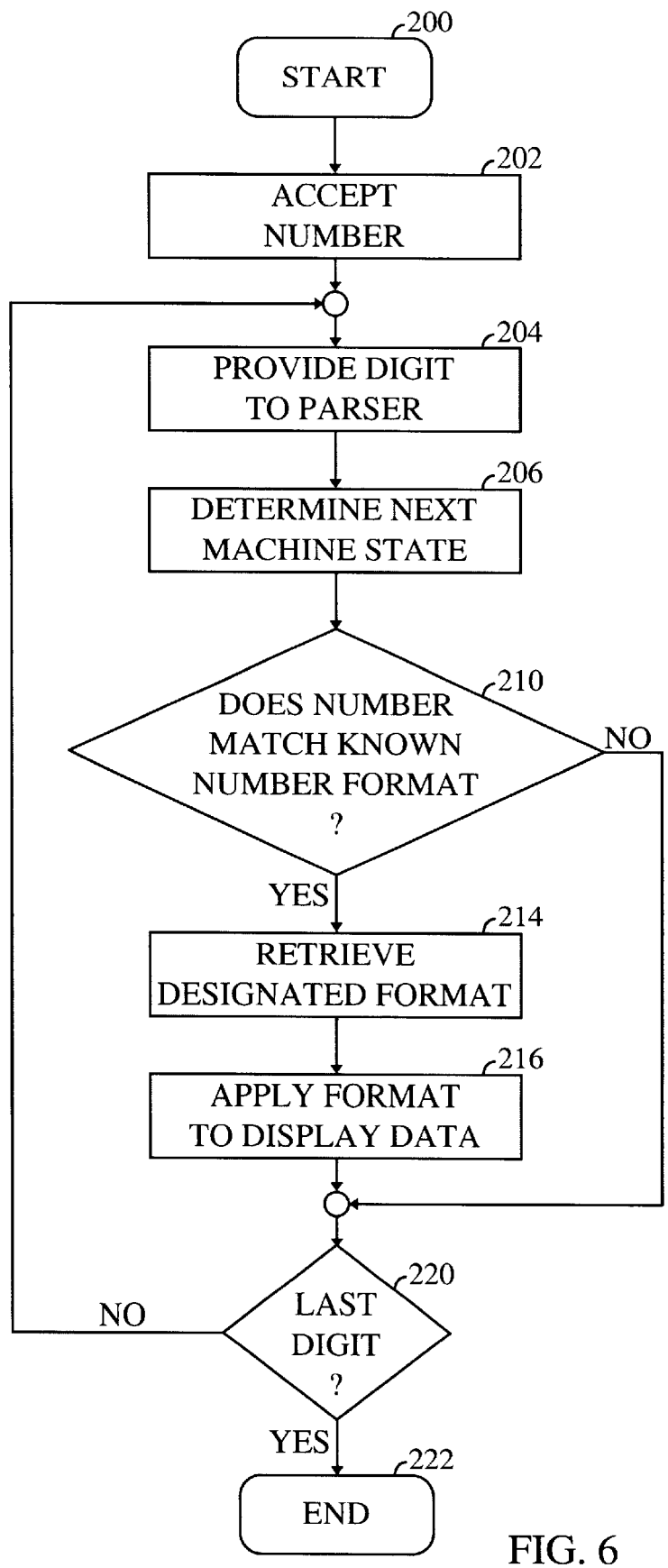
FIG. 6 is a flowchart illustrating the operation of the wireless communication device of FIG. 1.

The operation of the system 100 is illustrated in the flowchart of FIG. 6 at a start 200, the system is under power. In step 202, the system accepts a number. As previously discussed, the number may be manually provided by the user via the keypad 118 (see FIG. 1) or automatically extracted from the phone book storage area 126 or the call history storage are 130. Alternatively, the number may be provided to the system from an incoming call such as, by way of example, caller ID, automatic callback number within an SMS message, or in a callback number data portion in an SMS message. Thus, the system 100 will accept numbers from a variety of different sources. In step 204, the first digit of the number is provided to the parser 138 (see FIG. 1). In step 206, the parser determines the next machine state based on the digit provided in step 204. The parser 138 may conveniently use the data table 162 (see FIG. 4) or any convenient data structure which is contained in the dialing plan storage area 136 (see FIG. 1). In decision 210, the system 100 determines whether the number corresponds to a known number format. As described in examples above, the known formats may include, by way of example, a seven-digit local telephone number, a domestic long-distance call, an international long-distance call, or the like. Furthermore, the dialing plan storage area 136 may contain data for dialing plans for more than one country. The current dialing plan is selected by conventional editing techniques, as described above. If the number does correspond to a known number format, the result of decision 210 is YES. In that event, the system 100 retrieves the corresponding format in step 214. In step 216, a corresponding format is applied to the number and shown on the display 116.

If the result of decision 210 is NO, or upon formatting and display of data in steps 214 and 216, the system 100 moves to decision 220 to determine whether the digit is the last digit in the number. There are several techniques by which the system 100 can determine whether the last digit has been received. In an exemplary embodiment, the system 100 can use the data in the dialing plan storage area 136 (see FIG. 1) to determine how many digits should be received. For example, if the current state indicates that the number corresponds to a local call corresponding seven digits, the system 100 will await the receipt of seven digits. Alternatively, the system 100 may determine whether the last digit has been entered by virtue of other user activity, such as the activation of other buttons (e.g., the "Send" button to determine that the last digit has been entered. If the last digit has been entered, the result of decision 220 is YES and the system 100 ends at 222.

If the last digit has not been entered, the result of decision 220 is NO. In that event, the system 100 returns to step 204 to provide another digit to the parser 138 (see FIG. 1). In this manner, the system 100 applies the appropriate formatting to data shown on the display 116 by using the dialing plan specific to the location of the user.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A system to control display format in a wireless communication device in a selected geographic area using a predesignated calling plan, the system comprising:
   an input storage area to store input data, the input data comprising a sequence of digits;
   a plan storage area to store data related to the calling plan and containing data indicative of a display format applicable to a valid telephone number;
   a format storage area to store format data; and
   a parser to accept the input data from the input storage area and to use the input data to access the plan storage area and thereby determine if the input data corresponds to the valid telephone number, the parse applying formatting characters selected from the format storage area to the input data if the input data corresponds to the valid telephone number to thereby generate formatted display data; and
   a display coupled to the parser to receive and display the formatted display data; wherein the format storage area contains a predetermined format, the system further including a keypad having a plurality of keys operable by a user to generate keypad data and an edit processor operating in conjunction with the keypad to edit the predetermined format, the parser applying the user-edited format data to the input data if the input data corresponds to the valid telephone number.

2. The system of claim 1, further including a keypad having a plurality of keys operable by a user to generate keypad data that is stored in the input storage area, wherein the plan storage area contains state data indicative of a present state of the wireless communication device, the present state being altered in response to each entry of keypad data, the state data also containing data indicative of display formatting at the present state.

3. The system of claim 1 wherein the input storage area is a phone book storage area to store numbers, the system further including a keypad having a plurality of keys including a selection control button operable by the user to select one of the numbers in the phone book storage area, the selected number comprising a plurality of digits that are provided to the parser as the input data.

4. The system of claim 1 wherein the input storage area is a call history storage area to store numbers, the system further including a keypad having a plurality of keys including a selection control button operable by the user to select one of the numbers in the call history storage area, the selected number comprising a plurality of digits that are provided to the parser as the input data.

5. The system of claim 1, further including a transceiver to communicate with a communication device remote from the system, the transceiver receiving data from the remote communication device, the received data comprising a number stored in the input storage area, the number comprising a plurality of digits that are provided to the parser as the input data.

6. The system of claim 5 wherein the received data comprises a call back telephone number, the call back telephone number comprising a plurality of digits that are stored in the input storage area and provided to the parser as the input data.

7. The system of claim 1 wherein the format storage area contains a plurality of predetermined formats, each format including formatting characters, the system further including a keypad having a plurality of keys operable by a user to select one of the plurality of predetermined formats for use with the valid telephone number.

8. The system of claim 1 wherein the plan storage area contains data indicative of a plurality of different types of valid telephone numbers and a display format applicable to each of the valid telephone number types, the format storage area containing format data and formatting characters applicable to each of the valid telephone number types, the parser applying a selected format data corresponding to the valid telephone number type.

9. The system of claim 8 wherein the valid telephone number types correspond to a selected one of a group comprising a local call, a domestic long distance call, and an international long distance call.

10. A method for controlling display format in a wireless communication device in a selected geographic area using a predesignated calling plan, the method comprising:
   storing data related to the calling plan and data indicative of a display format applicable to a valid telephone number;
   receiving a sequence of digits as input data;
   using the input data to access the calling plan data and thereby determining if the input data corresponds to the valid telephone number;
   applying the display format to the input data if the input data corresponds to the valid telephone number to thereby generated formatted display data; and
   displaying the formatted display data; further comprising editing the stored data-indicative of the display format to thereby generate an edited display format, the act of applying the display format to the input data applying the edited display format.

11. The method of claim 10, further comprising:
   sensing user operation of a keypad;
   generating keypad data in response to user operation of the keypad; and
   storing the keypad data as the sequence of digits wherein the input data is generated by the keypad.

12. The method of claim 10 for use with a wireless communication device having a phone book storage area, the method further comprising:
   sensing user operation of a keypad to select one of the numbers in the phone book storage area; and generating the input data using the selected one of the numbers in the phone book storage area wherein the input data is generated from the phone book storage area.

13. The method of claim 10 for use with a wireless communication device having a call history storage area, the method further comprising:

sensing user operation of a keypad to select one of the numbers in the call history storage area; and generating the input data using the selected one of the numbers in the call history storage area wherein the input data is generated from the call history storage area.

14. The method of claim 10 for use with a wireless communication device having a transceiver to communicate with a communication device remote from the wireless communication device, the method comprising:

receiving data from the remote communication device, the received data comprising a number stored; and using the number as the input data sequence of digits.

15. The method of claim 14 wherein the received data comprises a call back telephone number, the method further comprising extracting the call back telephone number from the received data and using the call back telephone number as the input data.

16. The method of claim 10 wherein the act of storing comprises storing a plurality of display formats applicable to the valid telephone number, the method further comprising:

selecting one of the plurality of display formats to apply to the input data if the input data corresponds to the valid telephone number.

17. The method of claim 10 wherein the act of storing comprises storing a plurality of display formats corresponding to a plurality of different valid telephone number types, the act of using the input data to access the calling plan data further determining if the input data corresponds to any of the valid telephone number types and the act of applying the display format to the input data applying a selected one of the plurality of display formats corresponding to the valid telephone number type to thereby generate formatted display data.

18. The method of claim 17 wherein the valid telephone number types correspond to a selected one of a group comprising a local call, a domestic long distance call, and an international long distance call.

* * * * *